(12) United States Patent
Chen

(10) Patent No.: US 6,587,349 B1
(45) Date of Patent: Jul. 1, 2003

(54) FIXING DEVICE FOR COMPUTER FITTINGS

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/308,542

(22) Filed: Dec. 2, 2002

(30) Foreign Application Priority Data

Apr. 30, 2002 (TW) ...................................... 91205977 U

(51) Int. Cl.[7] ................................................ H05K 5/00

(52) U.S. Cl. ....................................... 361/752; 361/801

(58) Field of Search ................................. 361/752, 753, 361/754, 759, 796, 800, 801, 807; 403/24, 409.1

(56) References Cited

U.S. PATENT DOCUMENTS

| 5,984,728 A | * | 11/1999 | Chen et al. .................. 439/620 |
| 6,166,325 A | * | 12/2000 | Wu ........................ 174/35 GC |
| 6,307,756 B1 | * | 10/2001 | Liu et al. ..................... 361/816 |

* cited by examiner

*Primary Examiner*—David Martin
*Assistant Examiner*—Thanh S. Phan
(74) *Attorney, Agent, or Firm*—Wei Te Chung

(57) ABSTRACT

A fixing device (10) is adapted to fix one or more computer fittings (100) to a front plate (20) of a computer enclosure. The fixing device includes a panel (12). The panel has at least one engaging ear (14) for engaging in at least one engaging hole (242) defined in the front plate, and at least one locking tab (15) for engaging in at least one slot (262) defined in the front plate. The panel has a receiving portion (18) offset from a remainder of the panel a predetermined distance. The receiving portion is adapted for having at least one computer fitting secured thereon.

9 Claims, 4 Drawing Sheets

FIXING DEVICE FOR COMPUTER FITTINGS

BACKGROUND OF THE INVENTION

1. Field of the Invention

The present invention relates to fixing devices, and particularly to fixing devices for computer fittings.

2. Description of Related Art

In a typical personal computer, a plurality of fittings such as switches and connectors are fixed on a front plate of a computer enclosure. The front plate defines a plurality of various openings to accommodate the fittings. The fittings are commonly retained substantially inside the computer enclosure. However, room inside the computer enclosure is generally very limited. It is inconvenient to install or repair the fittings inside the computer enclosure. This is especially so when there are many fittings all retained in a single computer enclosure. Typical examples of this in the related art are disclosed in U.S. Pat. No. 5,347,430 and U.S. Pat. No. 5,497,292.

An improved fixing means for computer fittings that overcomes the above-mentioned problems is desired.

SUMMARY OF THE INVENTION

Accordingly, an object of the present invention is to provide a fixing device which quickly and conveniently secures one or more computer fittings to a face plate of a computer enclosure.

In order to achieve the object set out above, a fixing device in accordance with the present invention is adapted to fix one or more computer fittings to a front plate of a computer enclosure. The fixing device comprises a panel. The panel has at least one engaging ear for engaging in at least one engaging hole defined in the front plate, and at least one locking tab for engaging in at least one slot defined in the front plate. The panel has a receiving portion offset from a remainder of the panel a predetermined distance. The receiving portion is adapted for having at least one computer fitting secured thereon.

Other objects, advantages and novel features of the present invention will be drawn from the following detailed description of a preferred embodiment of the present invention with attached drawings, in which:

DETAILED DESCRIPTION OF THE INVENTION

Figure 1:
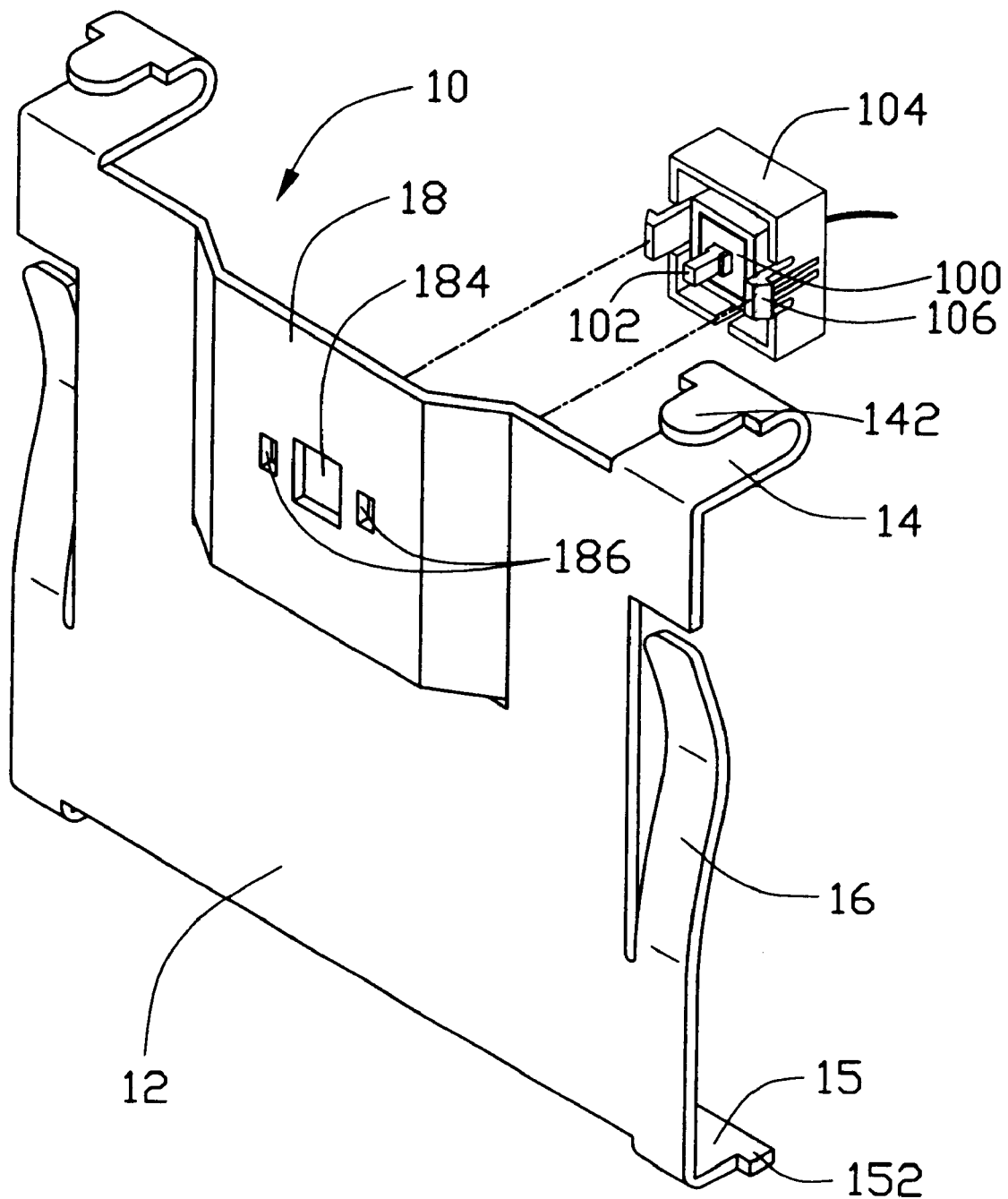
FIG. 1 is an exploded isometric view of a fixing device for computer fittings in accordance with a preferred embodiment of the present invention.

FIG. 1 is an isometric view of a fixing device 10 for one or more computer fittings in accordance with a preferred embodiment of the present invention. The fixing device 10 comprises a rectangular panel 12 having a receiving portion 18 offset from a remainder of the panel 12 a predetermined distance.

The panel 12 has a pair of engaging ears 14 extending from opposite top corners thereof respectively, a pair of spring fingers 16 formed in opposite sides thereof respectively, and a pair of locking tabs 15 extending from opposite bottom corners thereof respectively. Each ear 14 is generally U-shaped. A main portion of the ear 14 extends rearwardly from the panel 12, and a narrowed free end 142 of the ear 14 extends forwardly from the main portion. Each spring finger 16 is generally arcuate, and projects rearwardly from the panel 12. Each locking tab 15 extends rearwardly from the panel 12. A bar 152 is formed at a free end of each locking tab 15.

The receiving portion 18 is stamped such that it is offset from the remainder of the panel 12 the predetermined distance. A receiving opening 184 is defined in the receiving portion 18. A pair of locating holes 186 is defined in the receiving portion 18 at respective opposite sides of the receiving opening 184.

In the present invention, a switch 100 is introduced as an example of a computer fitting that is accessible from a front plate 20 (see FIG. 2) of a computer enclosure. The switch 100 has a housing 104. The housing 104 has a pair of clamps 106 at respective opposite sides thereof. The clamps 106 are adapted to engage in the locating holes 186 of the fixing device 10. The switch 100 also has a pushing element 102 extending from a middle of a main face thereof, for extension into the receiving opening 184 of the fixing device 10. It is to be understood that various suitable computer fittings can be secured to the receiving portion 18 as needed.

Figure 2:
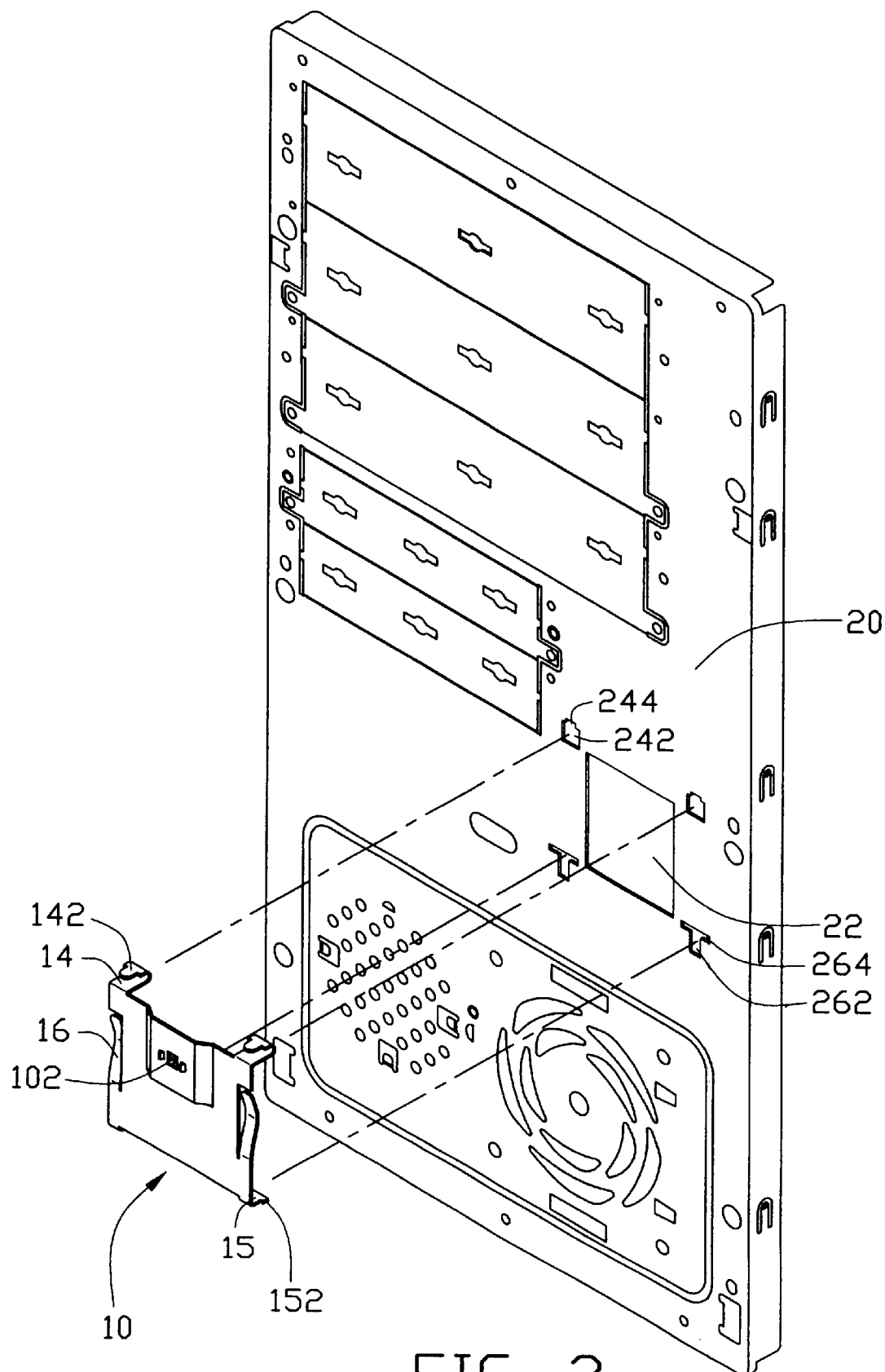
FIG. 2 is an exploded isometric view of a front plate of a computer enclosure together with the fixing device of FIG. 1.

Referring to FIG. 2, the front plate 20 of the computer enclosure defines a rectangular opening 22 corresponding to the fixing device 10. A pair of rectangular engaging holes 242 is defined in the front plate 20 at respective opposite sides of a top of the opening 22, for receiving the ears 14 of the fixing device 10. A pair of notches 244 is defined in the front plate 20 above and in communication with the respective engaging holes 242. A pair of T-shaped slots 262 is defined in the front plate 20 at respective opposite sides of a bottom of the opening 22. Each slot 262 comprises a top horizontal portion 264.

Figure 3:
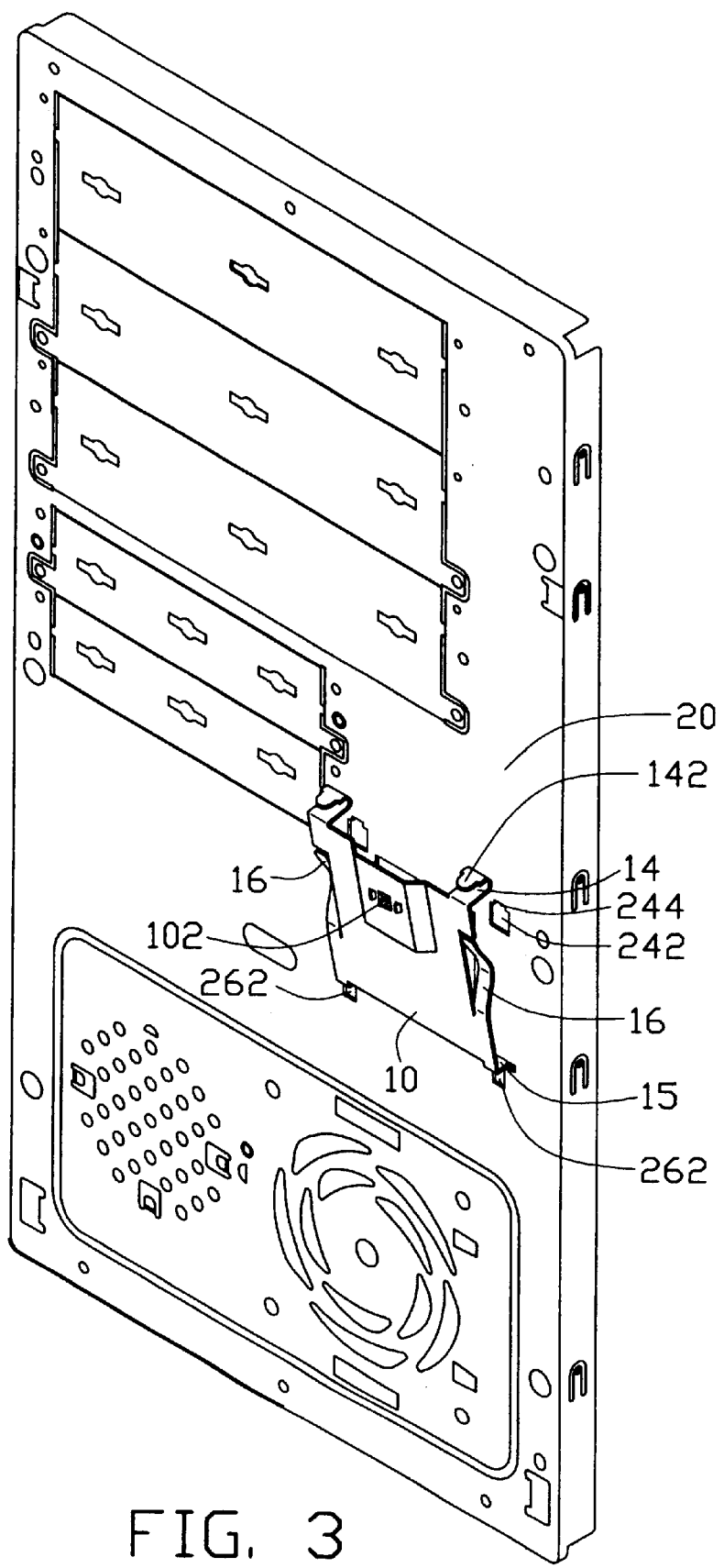
FIG. 3 is similar to FIG. 2, but showing the fixing device partly attached to the front plate.
Figure 4:
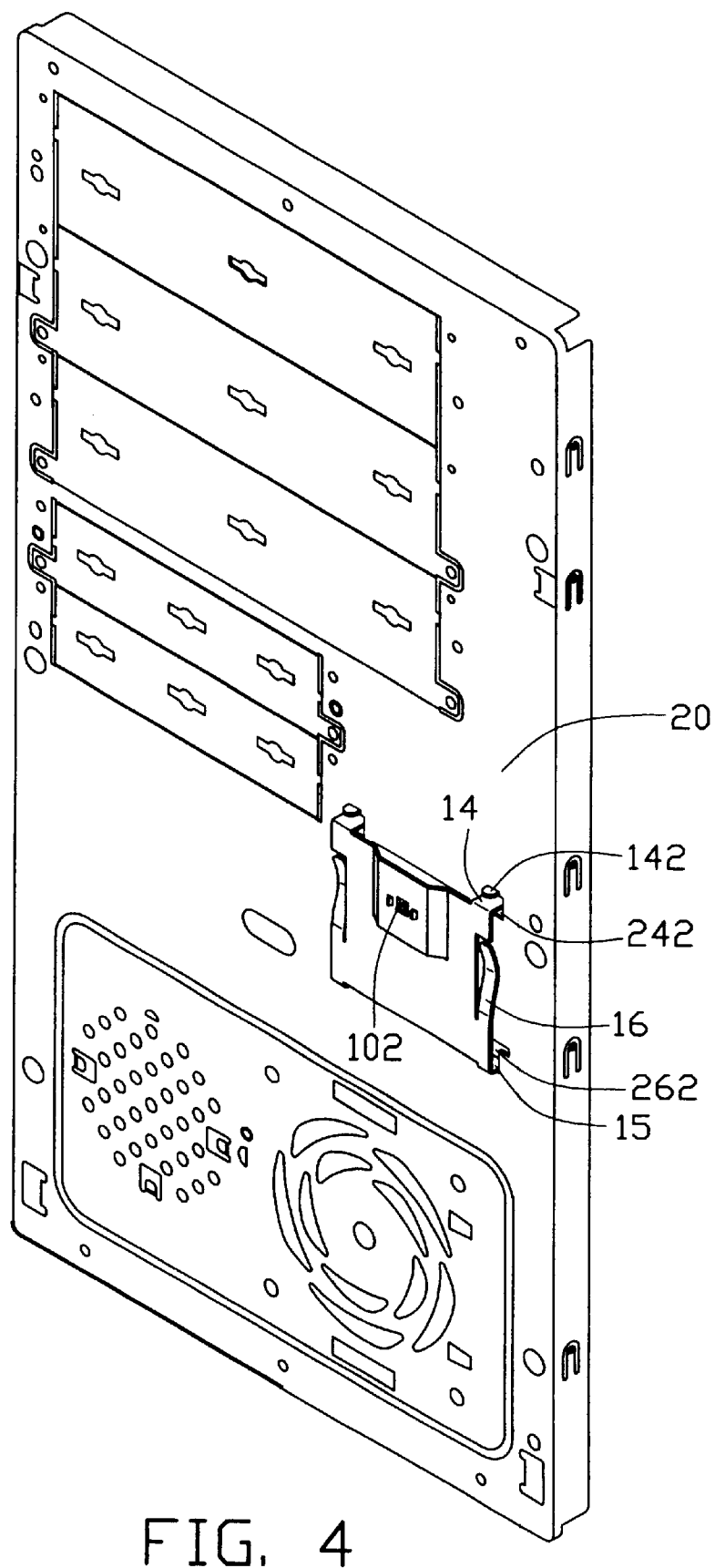
FIG. 4 is similar to FIG. 3, but showing the fixing device fully attached to the front plate.

Referring to FIG. 3, in assembly, the switch 100 is secured on the receiving portion 18 of the fixing device 10. The clamps are engagingly received in the locating holes 186. The pushing element 102 extends through the receiving opening 184. Then, the locking tabs 15 of the fixing device 10 are inserted into the horizontal portions 264 of the slots 262 of the front plate 20. The fixing device 10 is moved downwardly, and the locking tabs 15 slide into respective vertical portions of the slots 262. The bars 152 of the locking tabs 15 thus engage with the front plate 20. The fixing device 10 is pivoted toward the front plate 20. The ears 14 of the fixing device 10 are inserted into the engaging holes 242 of the front plate 20. A combined height of each engaging hole 242 and its adjacent notch 244 is predetermined. Accordingly, each ear 14 is deformably passed through the corresponding engaging hole 242 until the narrowed free end 142 snappingly engages in the notch 244. As a result, the spring fingers 16 resiliently abut against the front plate 20. The fixing device 10 is thus securely attached to the front plate 20. The switch 100 is accessible at an outside face of the front plate 20.

When the switch 100 needs to be detached from the front plate 20 for repair, maintenance or replacement, the free ends 142 of the ears 14 are pushed downwardly and pivoted outwardly. The ears 14 escape from the engaging holes 242 of the front plate 20. The fixing device 10 is lifted until the bars 152 of the locking tabs 15 reach the horizontal portions 264 of the slots 262. The locking tabs 15 are withdrawn from the slots 262. The switch 100 is then easily removed from the fixing device 10. Such removal is not encumbered by limitations of space inside the computer enclosure.

It is to be further understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising: a face plate defining an opening, at least one engaging hole near the opening, and at least one slot near the opening; and a fixing device comprising a panel and a receiving portion offset from a remainder of the panel a predetermined distance, the panel comprising at least one engaging ear for engaging in the at least one engaging hole of the face plate, and at least one locking tab for engaging in the at least one slot of the face plate, the receiving portion being adapted for having a computer fitting secured thereon;

wherein the engaging ear is resilient; wherein the engaging ear is generally U-shaped;

wherein the engaging ear has a narrowed free end; wherein at least one notch is defined in the front plate above and in communication with the at least one engaging hole.

2. The computer enclosure as described in claim 1, wherein the slot is generally T-shaped.

3. The computer enclosure as described in claim 1, wherein the locking tab has a bar at the free end thereof.

4. The computer enclosure as described in claim 1, wherein the fixing device has at least one spring finger.

5. The computer enclosure as described in claim 1, wherein the panel comprises two engaging ears extending from opposite top corners thereof, and two locking tabs extending from opposite bottom corners thereof.

6. A fixing device for fixing one or more computer fittings to a face plate of a computer enclosure, the fixing device comprising: a panel comprising at least one engaging ear and at least one locking tab adapted for engaging with the face plate, and a receiving portion adapted for having one or more computer fittings secured thereon, the receiving portion being offset from a remainder of the panel a predetermined distance;

wherein a bar is formed at a free end of the at least one locking tab; wherein the fixing device has at least one spring finger; wherein the receiving portion of the panel defines at least one opening adapted for receiving the one or more fittings: wherein a pair of locating holes is defined in the receiving portion at respective opposite sides of the at least one opening.

7. The fixing device as described in claim 6, wherein the at least one engaging ear is resilient.

8. The fixing device as described in claim 6, wherein the at least one engaging ear is generally U-shaped.

9. The fixing device as described in claim 6, wherein the panel comprises two engaging ears extending from opposite top corners thereof, and two locking tabs extending from opposite bottom corners thereof.

\* \* \* \* \*